United States Patent [19]

Evans

[11] Patent Number: 5,074,386

[45] Date of Patent: Dec. 24, 1991

[54] CASING BRAKE CONSTRUCTION

[75] Inventor: Alfred J. Evans, Raleigh, N.C.

[73] Assignee: Delaware Capital Formation, Inc., Apex, N.C.

[21] Appl. No.: 609,188

[22] Filed: Nov. 2, 1990

Related U.S. Application Data

[63] Continuation-in-part of Ser. No. 592,675, Oct. 3, 1990, abandoned, which is a continuation of Ser. No. 476,896, Feb. 8, 1990, abandoned.

[51] Int. Cl.$^5$ .................. B65H 59/10; A22C 11/00; A22C 21/00
[52] U.S. Cl. .................................. 188/67; 188/77 R; 188/82.6; 188/249; 188/259; 188/65.1; 452/32; 452/38
[58] Field of Search ................. 188/77 W, 77 R, 249, 188/259, 67, 251 A, 251 R, 251 M, 82.6; 192/107, 80, 81, 41 S, 75, 76; 267/166; 452/35, 37, 38, 31, 34, 46, 48, 32, 30, 45, 36, 41

[56] References Cited

U.S. PATENT DOCUMENTS

| | | | |
|---|---|---|---|
| 1,932,919 | 10/1933 | Abert et al. | 188/259 X |
| 3,542,181 | 11/1970 | Schell | 188/249 X |
| 3,711,917 | 1/1973 | Baumgras | 267/166 X |
| 3,837,441 | 9/1974 | Uno et al. | 188/82.6 |
| 3,999,633 | 12/1976 | Prouhet | 188/259 X |
| 4,023,238 | 5/1977 | Phares | 452/37 |
| 4,411,339 | 10/1983 | Porter | 188/77 W X |
| 4,457,406 | 7/1984 | Porter | 188/77 W X |
| 4,675,945 | 6/1987 | Evans et al. | 452/48 |
| 4,766,713 | 8/1988 | Evans | 452/48 |
| 4,837,896 | 6/1989 | Lockard | 452/38 |
| 4,847,953 | 7/1989 | Evans et al. | 452/36 |
| 4,887,332 | 12/1989 | Evans et al. | 452/38 |
| 4,932,103 | 6/1990 | Klusmire | 452/38 |
| 4,958,411 | 9/1990 | Stanley | 452/37 |
| 4,958,412 | 9/1990 | Stanek | 452/38 X |
| 4,991,260 | 2/1991 | Nausedas | 452/45 X |

Primary Examiner—Douglas C. Butler
Attorney, Agent, or Firm—Allegretti & Witcoff, Ltd.

[57] ABSTRACT

A casing brake is disclosed for use in combination with a generally tubular stuffing horn over which casing is released for filling with material discharged from the horn. The brake is of the type which includes a rigid housing which retains a deformable insert that fits over the horn and cooperates with the horn to engage the casing against the horn. Thus casing brake includes a first annular insert that has a throughbore with a circumferential groove on the inside of the throughbore with a second annular inner member which is comprised of a helical coil positioned within the groove, the inner member preferably being comprised of polytetrafluoroethylene with the outer member being elastically deformable with respect to the inner member to thereby alter the effective diameter of the groove causing an increase or decrease the diameter of the coil which, in turn, more loosely or more tightly grips the outside surface of the casing as it passes over the horn.

6 Claims, 3 Drawing Sheets

CASING BRAKE CONSTRUCTION

CROSS REFERENCE TO RELATED APPLICATION

This is a continuation-in-part application of Ser. No. 592,675, filed on Oct. 3, 1990, which is a continuation of Ser. No. 07/476,896, filed on Feb. 8, 1990, all prior continuations being abandoned in view of this continuation-in-part with priority claimed for the filing date of the prior continuations.

BACKGROUND OF THE INVENTION

This invention relates to devices for forming filled tubular products commonly known as chubs and, more particularly, to a device which includes a product discharge tube or stuffing horn from which shirred casing material sealed at one end, is released and filled with product discharged from the horn. The casing is held against the outside of the horn by means of a casing brake mechanism. The invention particularly relates to the construction of the casing brake mechanism which is an improved casing brake mechanism.

In the formation of filled tubular products in closed end links commonly known as chubs, material to be encased in a tubular casing is pumped through a stuffing horn into the casing retained on the stuffing horn in a shirred condition. The release of the casing is controlled by a brake mechanism as product or material is fed from the horn into the casing. The brake mechanism provides appropriate tension on the casing to assure a tightly filled product. Once a sufficient amount of material is filled into the casing, typically the end of the casing is bound, for example, with a metal clip. The operation continues successively thereby providing successive chubs or links.

One of the problems associated with casing brake constructions or mechanisms has been providing consistent control of tension on the casing as it is released from the stuffing horn. The casing brake constructions heretofore have not proven to be entirely satisfactory, particular when plastic casings are being utilized. The present invention comprises an improved, highly sensitive, easily adjustable casing brake construction.

SUMMARY OF THE INVENTION

In a principal aspect, the present invention comprises a casing brake mechanism which includes a housing that is generally annular and receives a compressible and deformable annular insert having an inner, circumferential groove. The insert is compressible between the housing and an adjustable nut threaded to the housing so as to engage the insert and thereby compress and distort the insert generally uniformly. Distortion of the insert effects or alters the diameter of the passage through the annular insert and, more particularly, the diameter of the circumferential groove on the inside of the throughbore defined by the insert. In a preferred embodiment, the insert includes a rectangular cross section internal peripheral groove on the inside surface of the bore through the insert. Positioned within this annular groove is a second insert in the shape of a spiral spring member. By effectively altering the configuration of the groove as the first insert is compressed, the effective diameter of the spiral spring shaped member is increased or decreased to more loosely or more tightly grip the outside surface of casing which passes between the inside of the brake mechanism and the stuffing horn.

Thus, it is an object of the present invention to provide an improved casing brake construction for use in combination with a stuffing horn.

It is a further object of the present invention to provide an improved casing brake construction which utilizes a combination of elements that permits easy adjustment of the internal diameter of a brake mechanism to thereby control the tightness or looseness of gripping force on casing material passing between the brake mechanism and a stuffing horn.

It is a further object of the invention to provide an improved casing brake mechanism which is easy to use, easy to repair and replace, and which provides improved adjustment characteristics relative to prior art mechanisms.

These and other objects, advantages and features will be set forth in a detailed description which follows.

BRIEF DESCRIPTION OF THE DRAWING

In the detailed description which follows, reference will be made to the drawing comprised of the following FIGURES.

DETAILED DESCRIPTION OF THE PREFERRED EMBODIMENT

Figure 4:
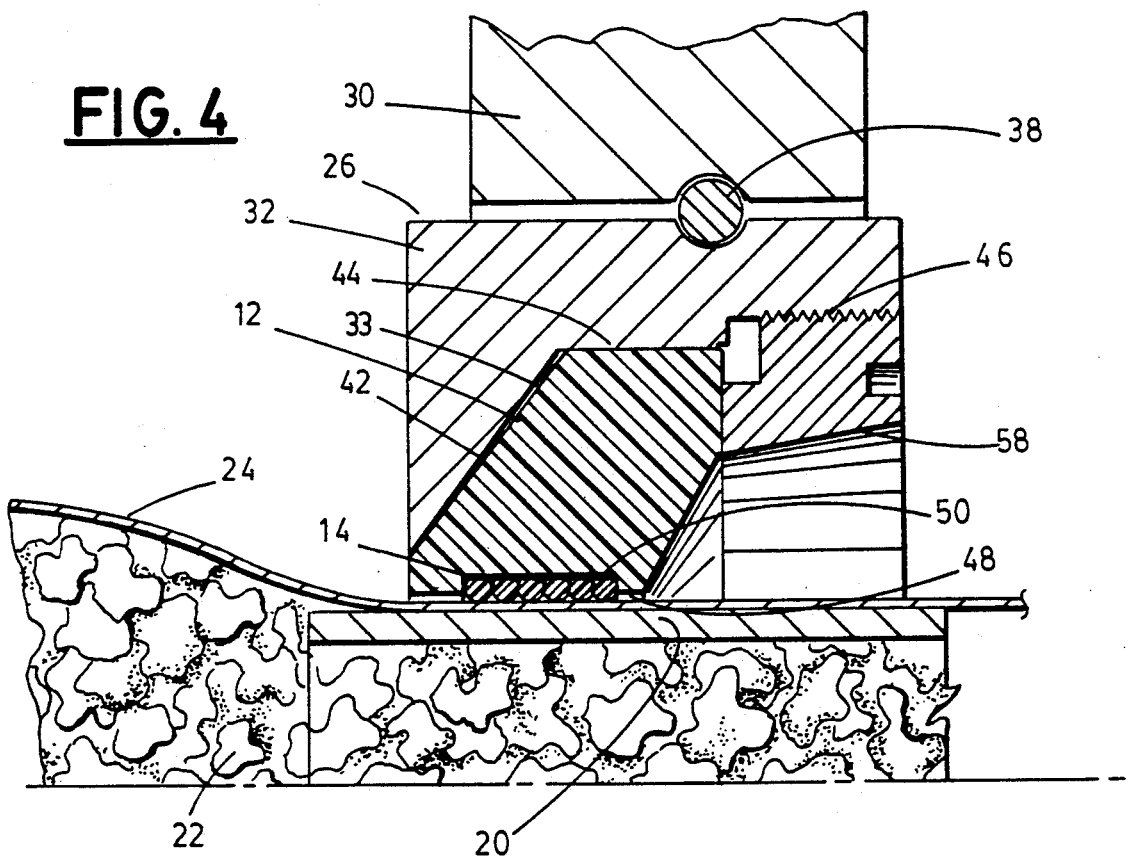
FIG. 4 is a partial cross-sectional view of an assembled brake construction mechanism utilizing the insert of FIG. 1 and illustrating the manner in which the brake mechanism may be adjusted in order to control the gripping force or tension on a casing.
Figure 5:
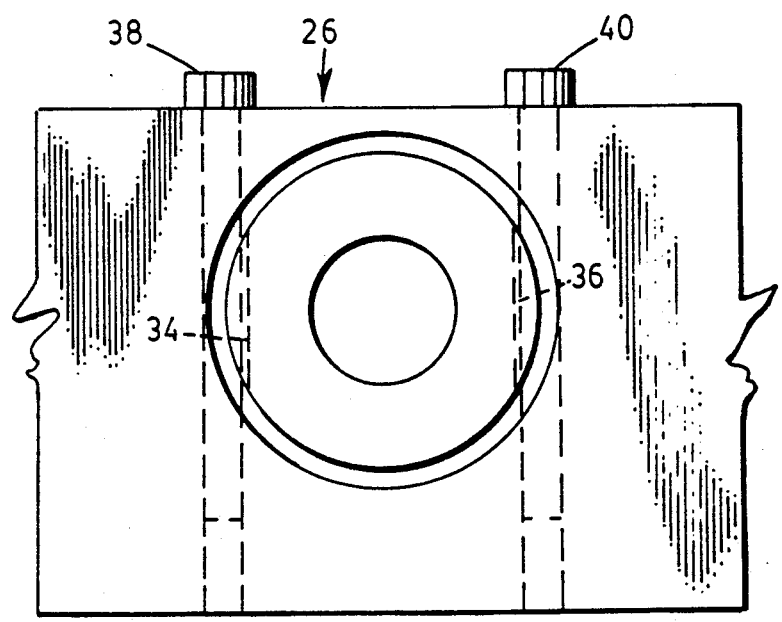
FIG. 5 is a front plan view of a typical brake assembly in combination with a stuffing horn.

Referring initially to FIG. 4 and FIG. 5, there is illustrated the environment of the improved casing brake construction or mechanism of the present invention. Typically a stuffing horn 20 comprises a generally tubular member through which product or material 22 is discharged into a casing 24. The casing 24 is typically shirred on the horn 20 and released from the horn over the outside surface thereof. The leading end of the casing 24 is typically closed so that the product 22 will be retained within the casing 24. Also it is typical to provide a casing brake mechanism, generally shown at 26, which interacts with the casing 24 and effectively grips the casing 24 against the stuffing horn 20 to thereby control the rate of release of the casing 24 and to prevent back flow of material 22 over the horn 20.

The brake mechanism 26 is generally comprised of a support frame 30 which retains a brake housing 32. The housing 32 may comprise a generally incompressible metal and/or synthetic annular member having parallel vertical grooves 34 and 36 on opposite sides thereof. The grooves 34 and 36 cooperate with retention pins 38 and 40 respectively which pass through openings in the frame 30 to thereby retain the housing 32 in a generally non-rotatable fixed position relative to the horn 20. the frame 30 may be adjusted over the horn 20 longitudinally to a desired position for efficient release of casing 24.

The housing 32, as previously mentioned, is comprised of a machined metal and/or synthetic member having a throughbore 33. The throughbore 33 is especially shaped and includes a tapered frustoconical section 42 with the small diameter of section 42 at the forward end of the housing 32. The frustoconical section 42 connects with a constant diameter section 44. The constant diameter section 44 is, in turn, in communication with a threaded, larger diameter section 46.

A first annular outer member 12 is positioned within the constant diameter bore section 44 and frustoconical bore section 42 being compatibly dimensioned to fit therein. The first annular outer member 12 includes a throughbore 48 having a generally rectangular cross section groove 50 in the surface of the throughbore 48. The groove 50 as well as the throughbore 48 are of a greater diameter than the stuffing horn 20 so as to allow the passage of casing 24 between member 12 and the horn 20. The first annular outer member 12 is comprised of a compressible material and thereby has an effective circumferential dimension associated with the bore 48 which is adjustable as the member 12 is compressed. That is, as the member 12 is compressed by a threaded annular nut 58 which cooperates with threaded passage 46, compression of the insert causes the effective diameter of the bore 48 and thus the effective circumferential dimension of the bore 48 to decrease. Note, however, that the internal diameter of the first annular member 12 does not engage the casing 24.

Figure 1:
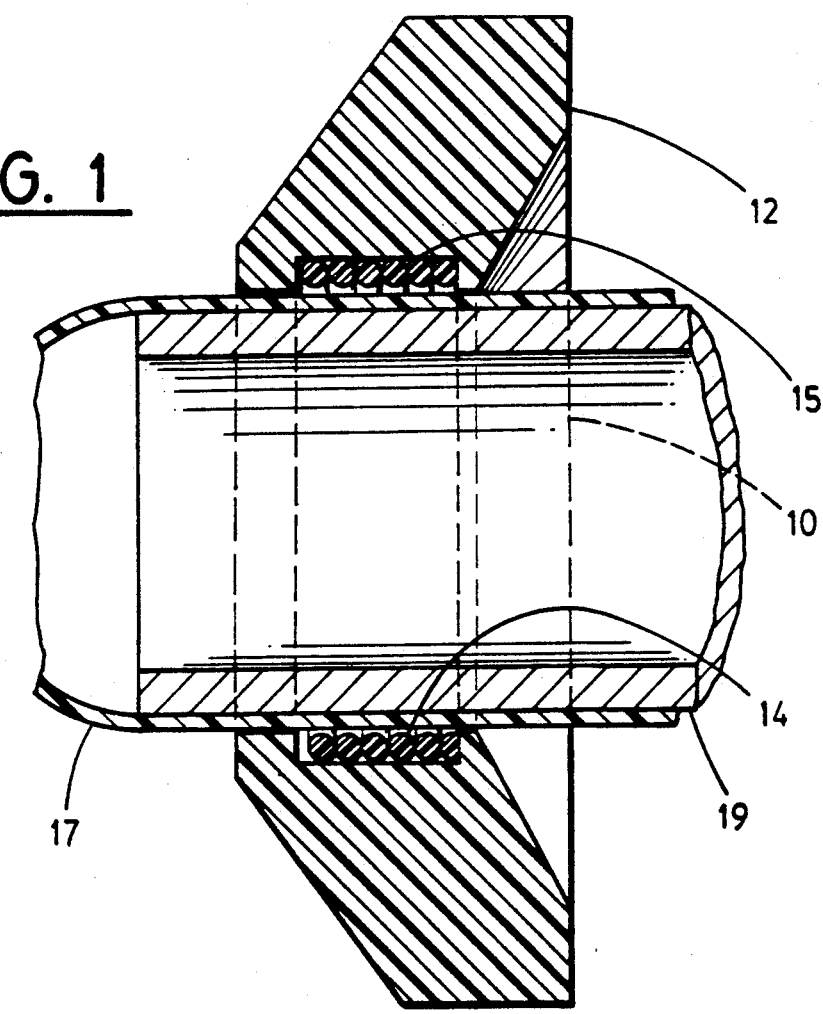
FIG. 1 is an enlarged cross-sectional view of the annular insert or outer member and inner insert which utilized in the improved brake construction of the invention.

Rather a second annular member 14 retained within the groove 50; namely, spiral spring member or inner member 14 located within the groove 50 is positioned and sized so as to fictionally engage the casing 24. The material utilized for the inner member 14 is a selflubricating material such as polytetrafluoroethylene. The inner member 14 in first preferred embodiment is shown in FIGS. 1 and 4 a spiral spring configuration having a diameter which is greater than the depth of the groove 50. The inner member 14 is not as compressible as the outer member 12. Thus as the dimensional characteristics of the outer member 12 are changed due to compression resulting from the nut 58 being tightened down, the dimensional changes associated with the outer member 12 are imposed on the inner member 14. Thus as the nut 58 is tightened it compresses the inner member 14 against the casing 24. Release of nut 58 effectively increases the circumference of through base 48 and releases the inner member 14 from horn 20. Gradual and accurate adjustment of tension on a casing 24 is then provided.

Figure 2:
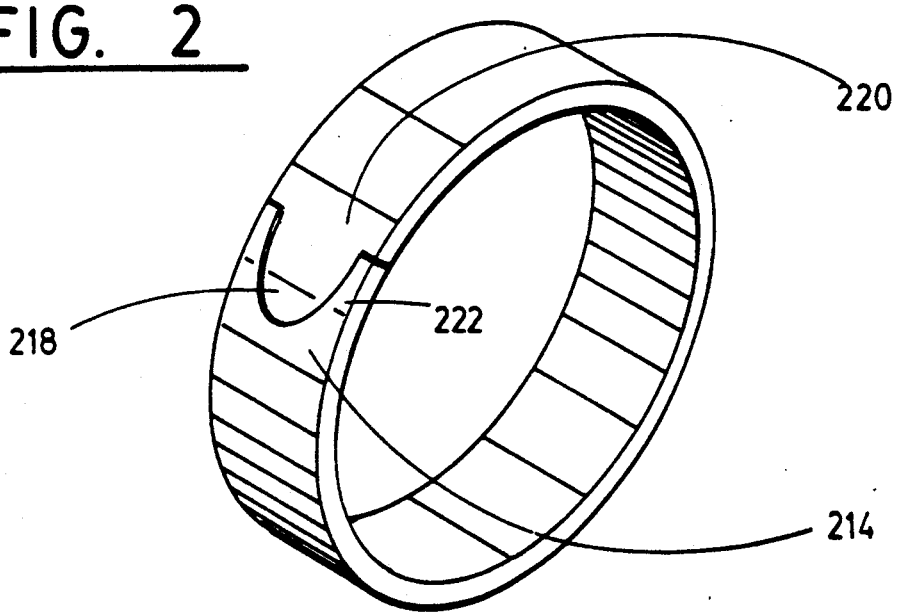
FIG. 2 is a perspective view of an alternative inner insert which may be utilized in combination with an outer insert of the type shown in FIG. 1.
Figure 3:
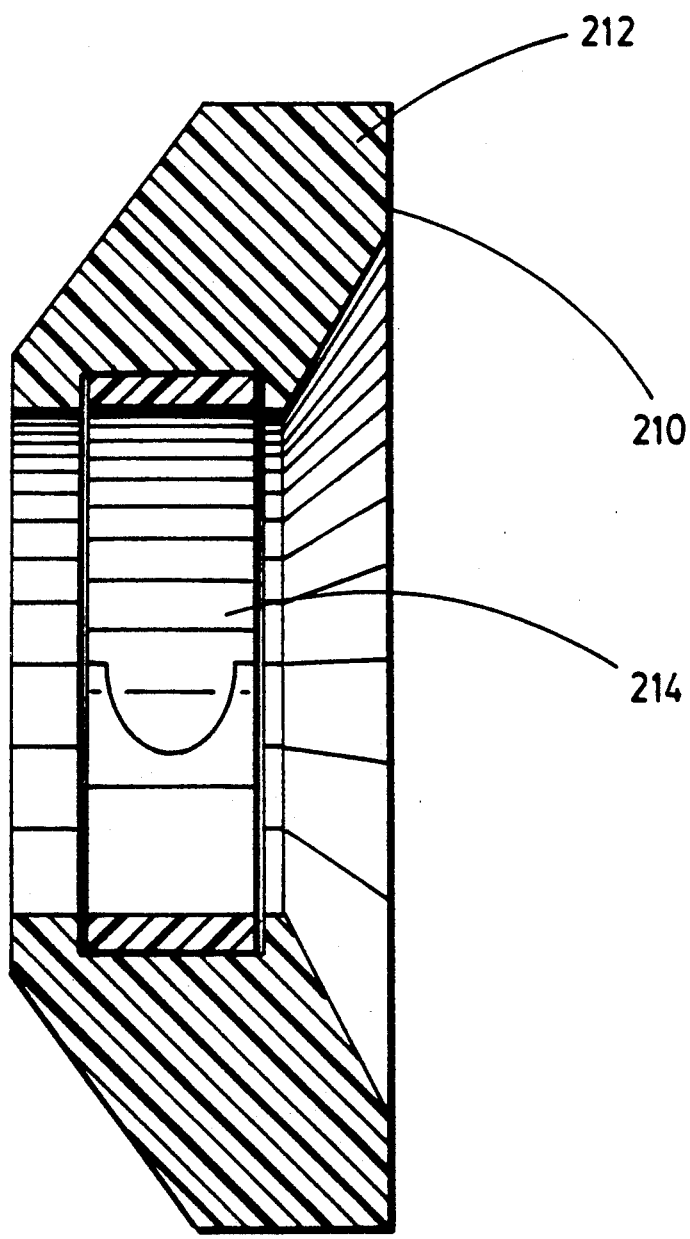
FIG. 3 is a cross-sectional view of the combined outer insert of FIG. 1 and inner insert of FIG. 2.

FIGS. 2 and 3 illustrate an alternative to the spiral spring construction of FIGS. 1 and 4. As disclosed in FIGS. 2 and 3, outer member 212 receives an annular collar 214 which cooperates with the groove 50 defined in the member 212. There is a gap 218 between the opposite ends 220, 222 of the collar 214 to permit alternation of the circumferential dimension thereof upon compression of the insert 210. It is possible to vary the configuration and construction of the invention by altering the materials or by altering the construction and configuration of the insert 14 which is positioned within the groove 50. The invention is therefore limited by only the following claims and their equivalents.

What is claimed is:

1. A casing brake for use in combination with a generally tubular stuffing horn over which casing is released for filling with material discharged from the horn, said casing brake of the type which fits over the horn and cooperates therewith against casing that passes between the brake and horn, said brake comprising in combination:
   a generally rigid, non-rotatable brake housing having a central throughbore and a receiving pocket in the throughbore for an elastically deformable, annular shaped outer member;
   a first annular outer member including a throughbore with a first diameter having a circumferential groove in the throughbore;
   a second annular inner member retained within the groove, said second member comprised of an insert positioned within the groove, having an effective circumferential dimension which is adjustable, said first outer member being deformable with respect to the inner member to effectively alter the configuration of the groove and thereby increase or decrease the effective circumferential dimension to more loosely or more tightly grip the outside surface of a casing which passes between the inside of the inner member and the stuffing horn; and
   means cooperative with the housing for engaging the outer member and deforming the outer member.

2. The casing brake of claim 1 wherein the inner member is comprised of a helical coil retained in the groove.

3. The casing brake of claim 1 wherein the inner member is a split band.

4. The casing brake of claim 1 wherein the inner member is comprised of a selflubricated, non-contaminating, generally low friction, non-metallic material.

5. The brake of claim 4 wherein the inner member is comprised of polytetrafluoroethylene.

6. The brake of claim 1 wherein the outer member inside diameter does not engage casings.

* * * * *